(12) United States Patent
Cheruel

(10) Patent No.: US 9,510,213 B2
(45) Date of Patent: Nov. 29, 2016

(54) METHODS AND SYSTEMS FOR INTERFERENCE IMMUNITY USING FREQUENCY ALLOCATION LISTS IN DEVICES HAVING EMBEDDED SYSTEMS

(71) Applicant: ST-Ericsson SA, Plan-les-Ouates (CH)

(72) Inventor: Fabrice Cheruel, Mulsanne (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 462 days.

(21) Appl. No.: 13/856,554

(22) Filed: Apr. 4, 2013

(65) Prior Publication Data

US 2014/0301279 A1  Oct. 9, 2014

(51) Int. Cl.
*H04W 24/02* (2009.01)
*H04W 72/00* (2009.01)
*H04L 5/00* (2006.01)

(52) U.S. Cl.
CPC ............ *H04W 24/02* (2013.01); *H04W 72/00* (2013.01); *H04L 5/0073* (2013.01)

(58) Field of Classification Search
USPC .................................. 713/501; 370/329, 330
See application file for complete search history.

(56) References Cited

U.S. PATENT DOCUMENTS

| 8,626,102 | B1 * | 1/2014 | Bidichandani | H04B 15/04 455/164.2 |
| 8,644,782 | B2 * | 2/2014 | Tripathi | G06F 1/08 375/354 |
| 8,768,278 | B2 * | 7/2014 | Frank | H04B 15/06 375/355 |
| 2008/0081586 | A1 * | 4/2008 | Sreerama | G06F 1/08 455/255 |
| 2009/0037759 | A1 * | 2/2009 | Lagnado | G06F 1/12 713/501 |
| 2009/0138745 | A1 * | 5/2009 | Dorsey | H04B 15/04 713/501 |
| 2009/0257396 | A1 * | 10/2009 | Eliezer | H04B 1/036 370/330 |
| 2010/0137025 | A1 | 6/2010 | Tal et al. | |
| 2012/0040715 | A1 * | 2/2012 | Fu | H04B 1/1027 455/553.1 |
| 2012/0182896 | A1 * | 7/2012 | Jang | H04W 28/048 370/252 |
| 2013/0331137 | A1 * | 12/2013 | Burchill | H04W 52/243 455/501 |

OTHER PUBLICATIONS

Zhu et al. "Multi-Radio Coexistence: Challenges and Opportunities" Communications Technology Labs, Intel Coporation, 2007 IEEE, Accessed at http://ieeexplore.ieee.org/stam/stamp.jsp?tp+&amumber=4317845.*

* cited by examiner

*Primary Examiner* — Andrew Lai
*Assistant Examiner* — Jamaal Henson
(74) *Attorney, Agent, or Firm* — Patent Portfolio Builders PLLC

(57) ABSTRACT

Methods and systems for performing interference mitigation (immunity management) in a radio communication device. A list of frequencies is provided from at least one radio subsystem to an immunity management (IMM) module. The IMM module determines whether any of the frequencies in the list represent a conflict with harmonics associated with one or more clock frequencies associated with one or more embedded systems. If a conflict exists, then the IMM module makes a change in the fundamental frequency of the corresponding clock to remove the conflict, while also ensuring that other frequencies in the list are not impacted by the change. The potential need to change clock frequencies can be evaluated at state transitions of the device, e.g., call establishment, call release, handover or channel re-allocation events.

13 Claims, 4 Drawing Sheets

METHODS AND SYSTEMS FOR INTERFERENCE IMMUNITY USING FREQUENCY ALLOCATION LISTS IN DEVICES HAVING EMBEDDED SYSTEMS

TECHNICAL FIELD

The present invention relates generally to radio communication devices and, more specifically, to methods, devices and systems for interference immunity in radio communication devices.

BACKGROUND

At its inception radio telephony was designed, and used for, voice communications. As the consumer electronics industry continued to mature, and the capabilities of processors increased, more devices became available for use that allowed the wireless transfer of data between devices. Also more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found an increasing need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems were implemented in GSM with the addition of the General Packet Radio Services (GPRS), sometimes referred to as a "2G+" system. 3G systems introduced by Universal Terrestrial Radio Access (UTRA) standards made applications like surfing the web more easily accessible to millions of users (and with more tolerable delay), and now 4G systems such as those operating in accordance with the Long Term Evolution (LTE) standard are being rolled out and into service. Thus, numerous radio access technologies (RATs), such as e.g. Wideband Code Division Multiple Access (WCDMA), OFDMA, TDMA, TD-SCDMA, and others, can be found in use today in wireless systems such as e.g. GSM/GPRS/EDGE, UMTS, UMTS-LTE, WLAN, WiFi, etc.

This evolution of network designs has resulted in various network operators deploying their networks in various frequency bands with different RATs in various geographical areas. As a result of this, a radio communication device or user equipment (UE) which supports several frequency bands and/or several different RATs will need to be able to, among other things, deal with issues which arise from implementing such devices having radios with, e.g., overlapping frequency bandwidths. The resolution of such issues is frequently referred to as "co-existence management", i.e., the provision of a capability to allow potentially interfering radios to operate in close proximity to one another.

In addition to co-existence issues which arise in the context of multiple radios, similar issues arise in radio devices which are architected as embedded systems. For example, many of today's portable devices are architected as embedded systems having specialized processors (DSPs) which handle specific functions, such as interfacing with a display, camera or multimedia card and operating as a memory controller. Each of these devices may have its own clock or clock signal which can generate harmonics at frequencies which are the same as those used by the radio in the portable device. Such harmonics interfere with the operation of the radio by "leaking" energy into the receiver circuitry at a conflicting frequency thereby reducing receiver sensitivity.

Such problems are particularly significant in radio devices which operate in accordance with, for example, the 2G/2G+ standard (i.e., GSM/GPRS/EGPRS). This is because for 2G/2G+ devices there is a relatively small bandwidth for a given radio channel (i.e., a 200 kHz channel), making such devices more sensitive to this type of interference. By way of comparison a 3G radio channel is typically 4 MHz in bandwidth and an LTE radio channel is typically 1.5 MHz to 20 MHz in bandwidth.

Various solutions have been proposed, which are sometimes generally referred to as immunity management techniques, i.e., techniques which immunize circuitry from sensitivity clock harmonics. In general, one solution to this problem is to slightly change the clock frequency of the processor (sometimes referred to as the "aggressor" in co-existence or immunity terms) which is generating conflicting harmonics with the radio (sometimes referred to as the "victim" in co-existence or immunity terms). However this frequency changing solution is problematic for radio devices which operate using frequency hopping techniques, e.g., systems wherein the channel frequency allocated to the radio device changes periodically during the connection. For example, in 2G/2G+ systems, the frequency allocated to a particular channel changes (hops) every 5 ms. In such a frequency hopping system then, if a change is made to an aggressor's clock frequency to address harmonics associated with a radio's reception of signals at a first hopping frequency, that change may no longer be valid 5 ms later when the radio channel's frequency changes to a second hopping frequency. Moreover, for various reasons, it is impractical to change the clock frequency of an aggressor's clock signal every 5 ms, e.g., due to potential instability and/or latency issues.

Accordingly, it would be desirable to provide methods, devices and systems which address these, and other, challenges.

BRIEF DESCRIPTION OF THE DRAWINGS

The accompanying drawings illustrate exemplary embodiments, wherein.

ABBREVIATIONS AND ACRONYMS LIST

Figure 1:
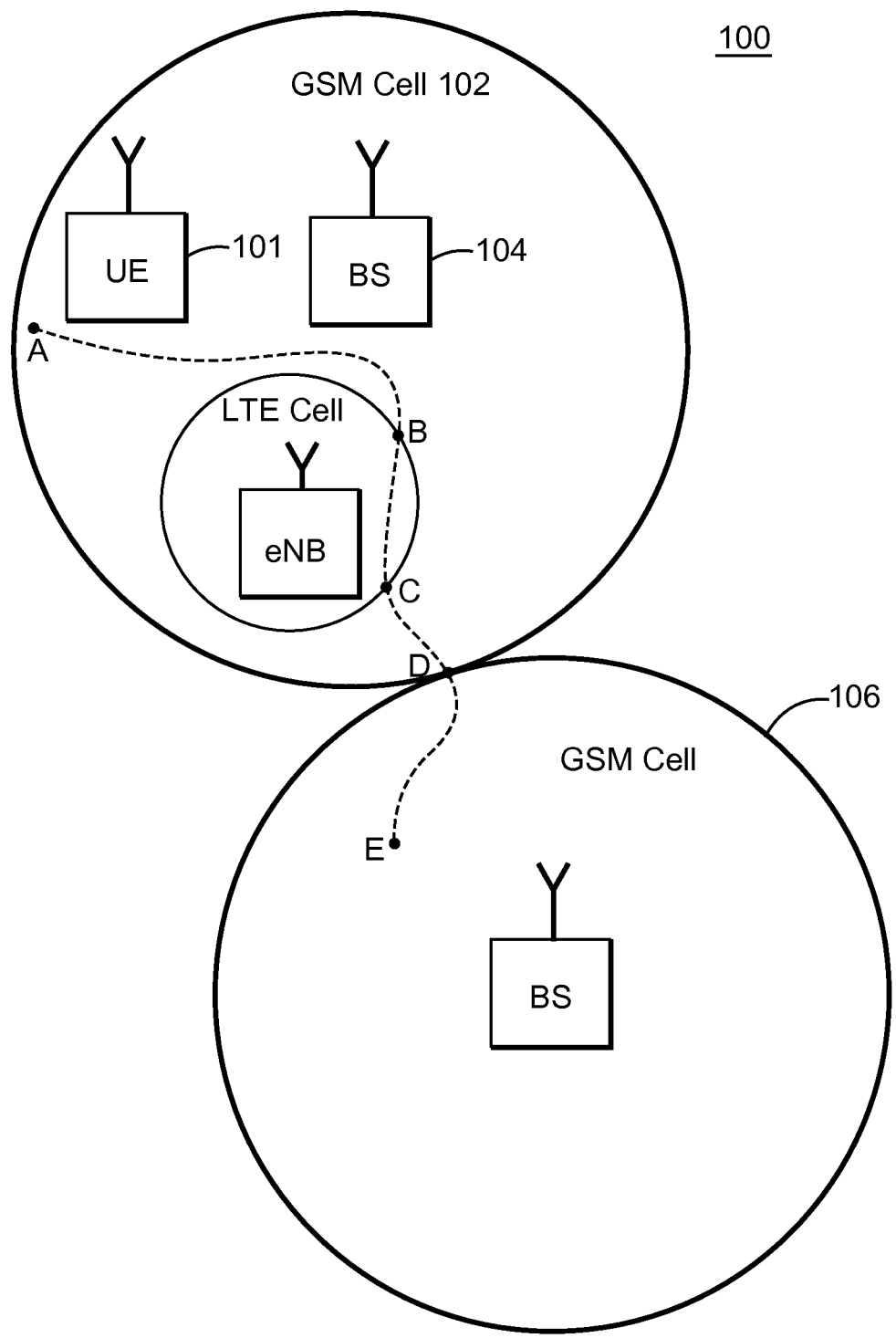
FIG. 1 is a high level illustration of overlapping radio communication systems including examples of state transition points in which embodiments can be implemented.

AP Application Processor
CSI Camera Serial Interface
DDR Dual Data Rate (Memory Controller)
DSI Display Serial Interface
EGPRS Enhanced General Packet Radio Service
GSM Global System for Mobile
GPRS General Packet Radio Service
HW Hardware IMM Immunity Management
LTE Long Term Evolution
MA Mobile Allocation
MMC Multimedia Card
Ms Milliseconds
OS Operating System
SD Secure Digital
SW Software
UC Use Case
WCDMA Wideband Code Division Multiple Access
2G Second Generation (Cellular Systems)
3G Third Generation (Cellular Systems)
4G Fourth Generation (Cellular Systems)

SUMMARY

According to an embodiment, a method for immunity management associated with one or more embedded systems operating within a radio communication device includes providing, by at least one radio communication subsystem, a list of frequencies, which have been allocated to the radio communication device for communication with at least one corresponding radio communication network, to an immunity management (IMM) module, determining, by the IMM module, whether any of the frequencies in the list of frequencies conflicts with any harmonics associated with one or more clock frequencies used by the one or more embedded systems, and, if a conflict exists, then adjusting a corresponding one of the one or more clock frequencies by a predetermined amount to resolve the conflict and to ensure that any harmonics associated with the adjusted clock frequency also do not conflict with any of the frequencies in the list of frequencies.

According to another embodiment, a radio communication device includes at least one embedded system, at least one radio communication subsystem configured to transmit and receive radio communication signals and to provide a list of frequencies, which have been allocated to the radio communication device for communication with at least one corresponding radio communication network, to an immunity management (IMM) module, wherein the IMM module is configured to determine whether any of the frequencies in the list of frequencies conflicts with any harmonics associated with one or more clock frequencies used by the one or more embedded systems, and wherein if a conflict exists, then the IMM module is configured to adjust a corresponding one of the one or more clock frequencies by a predetermined amount to resolve the conflict and to ensure that any harmonics associated with the adjusted clock frequency also do not conflict with any of the frequencies in the list of frequencies.

These, and other, embodiments are described in more detail below. Among other things, such embodiments enable reduction or elimination of interference or reduction in receiver sensitivity associated with harmonics of aggressor clocks in embedded systems relative to a radio subsystem in a device.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics described herein may be combined in any suitable manner in one or more embodiments.

According to embodiments, an aggressor's clock frequency is modified based on a frequency allocation list (or hopping sequence) of the victim. To accomplish this function according to an embodiment, an IMM and coexistence manager is implemented in, for example, the embedded system software. For example, modem and/or connectivity subsystems can broadcast frequency allocation information at a state transition times, e.g., when the network changes a frequency allocation to a user equipment, such that the IMM and coexistence manager can change the aggressor's clock frequency based on the frequency allocation list of the victim at this predetermined time.

Prior to describing these embodiments in more detail, an example of a radio communication system 100 in which devices according to such embodiments can operate is provided in order to provide some context. As shown in FIG. 1, a portable radio communication device 101 (e.g., a cellular phone, tablet device, or any other device having radio communication capabilities, also sometimes called a user equipment (UE) is depicted as operating at time A within a cell 102 supported by a base station 104 which is associated with a first type of radiocommunication system, e.g., GSM/GPRS. As will be appreciated by those skilled in the art, radio communication signals are transmitted by the portable radio communication device 101 to the base station 104 on an uplink channel, and radio communication signals are received by the portable radio communication device 101 from the base station 104 on a downlink channel. In this example where the first type of radiocommunication system is a GSM/GPRS system, the uplink and downlink channels can be provided using a time division multiple access (TDMA) air interface methodology of an allocated uplink and downlink frequency, which frequencies may be varied according to a predetermined frequency hopping sequence. The reader interested in more details related to GSM/GPRS radiocommunication systems is directed to the relevant standards documents which can be found, for example, at the website of 3GPP.org.

As will also be appreciated by those skilled in the art, frequency hopping is a form of spread spectrum technique which is intended to mitigate certain types of interference between radio communication devices. Generally speaking, frequency hopping involves the periodic changing of frequencies used by a transmitter, e.g., portable radio communication device 101, to transmit its uplink radio signals to the base station 104. By way of comparison, non-frequency hopping TDMA systems will typically maintain the same frequency channel between a UE and a base station during a connection. In order to enable the two radio communication devices involved in the communication link to know on which frequency to listen (i.e., demodulate/decode radio signal energy) at a given time, both of the radio communication devices involved in the link, e.g., portable radio communication device 101 and base station 104 need to be aware of the frequency hopping sequence so that they can tune their transmitter and receiver chains to the appropriate frequency at the appropriate time. Thus each of the devices in a frequency hopping radio system will have stored therein, or signaled thereto, a frequency hopping sequence associated with the radio channel which has been allocated for a particular connection. The frequency hopping sequence can be expressed in many different forms, e.g., an explicit list of frequencies in a particular order, a sequence identifier associated with a list of ordered frequencies, etc.

As a purely illustrative example, consider that radio communication device 101 is allocated a downlink radio channel at call establishment including frequencies 931, 936, 941, 950, 951 and 960 (all in MHz) by base station 104. While radio communication device 101 is communicating with base station 104, it will thus change (tune) its reception frequency from one frequency to the next in the list at predetermined times, e.g., every 5 ms, and, similarly, the base station 104 will change (tune) its transmission frequency to the same frequency in the list at the same time.

In addition to the frequency hopping aspect of system 100, another aspect of interest for the embodiments described herein are various use cases associated with operation of the radio communication device 101, e.g., call establishment, handover and call release, which are individually or collectively referred to herein as "state transitions" of the radio communication device 101. These state transitions are significant for the embodiments described below as they relate to the times at which one or more clock frequencies of the aggressor(s) can be modified, which times are typically relatively infrequent relative to the frequency hopping period.

For example, in addition to the call establishment for UE 101 at time A in cell 102, other state transitions could occur as the UE 101 moves within the system 100 as shown by the dotted line in FIG. 1. At time B, UE 101 crosses into an LTE cell having an eNB which provides radio communication service therein. If the UE 101 is a dual mode (dual radio) GSM/LTE device, then it may be handed over to the associated LTE system at time B, which state transition can cause an adjustment in an aggressor's clock frequency. Similarly, at time C, when UE 101 leaves the LTE cell and returns to GSM cell 102, or when UE 101 leaves GSM cell 102 and enters GSM cell 106, either or both of these state transitions may again cause a re-evaluation and change of an aggressor's clock frequency. Additionally, when the user hangs up the call (call release) at time E, this results in another state transition which can cause embodiments described below to change an aggressor's clock frequency.

Note that the example provided in FIG. 1, and the description thereof, is purely illustrative and the present invention is not limited to operation in such a system. For example, radio communication device 101 need not be mobile, and the radio communication system or systems involved need not be GSM/GPRS and/or LTE systems. Instead the example of FIG. 1 is merely provided to illustrate certain broader contextual aspects in which the embodiments described below can operate.

Figure 2:
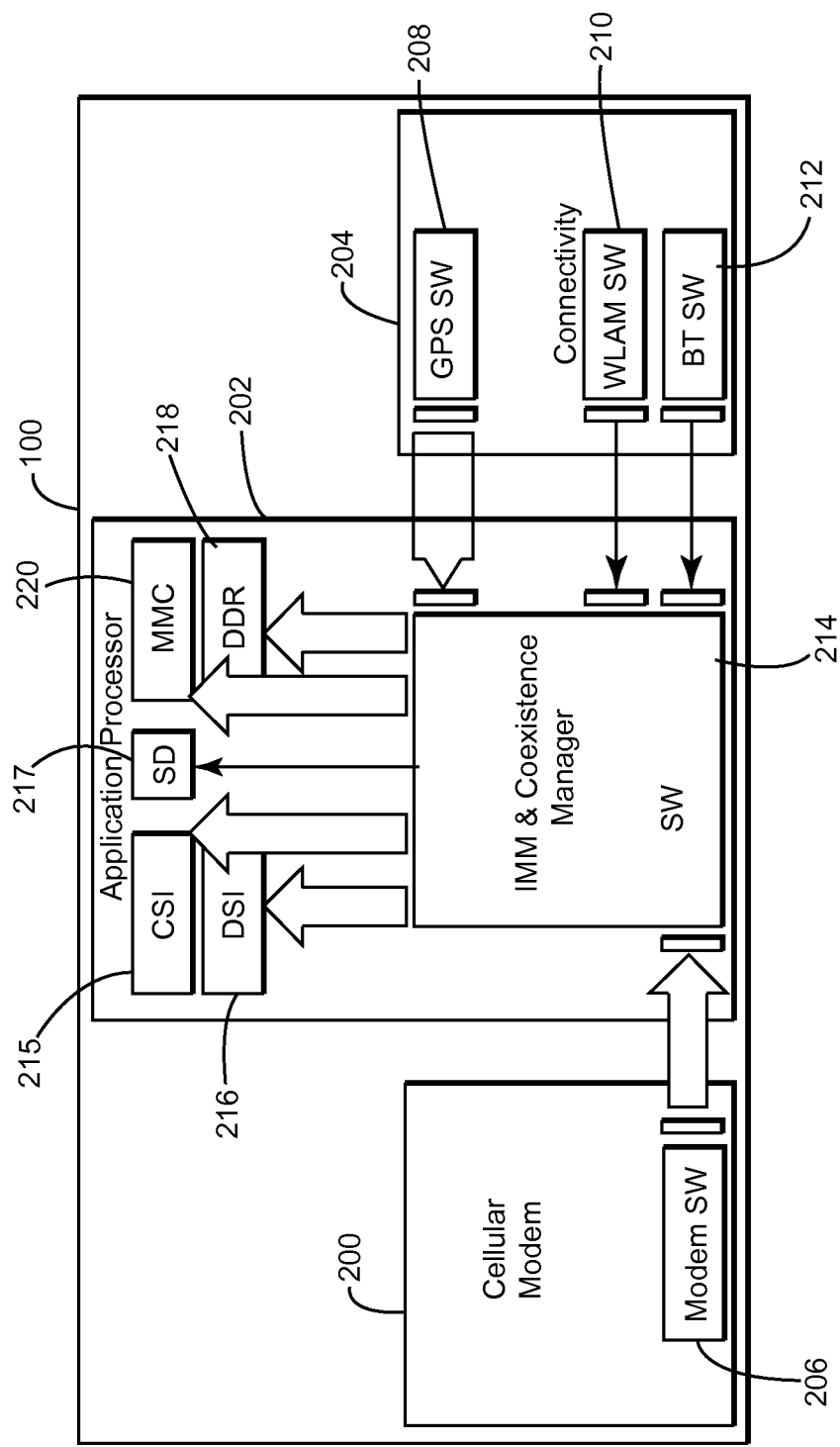
FIG. 2 shows a radio communication device according to an embodiment.

As mentioned earlier, these embodiments find particular applicability to (but are not limited to) radio communication devices 100 which employ embedded system architecture. An example of such a device 100 is illustrated in FIG. 2. Therein, three general hardware devices, a cellular modem subsystem 200, an application processor (AP) subsystem 202 and a connectivity subsystem 204 are shown. The cellular modem subsystem handles (and has software 206 for) radio signal processing associated with one or more cellular standards (e.g., 2G, 3G, and/or 4G), while the connectivity sub-system 204 handles (and has software for) signal processing associated with one or more connectivity standards, e.g., GPS software 208, WLAN software 210 and/or BT software 212.

One or more of the various modem and connectivity software modules 206-212 provide input(s), e.g., in the form of frequency allocation list(s), to an IMM and Coexistence Manager software module 214. As will be described in more detail below, these input(s) are used by the IMM and Coexistence Manager software module 214 in order to adjust a clock frequency of one or more aggressors when a state transition occurs. In the example device 100, the potential aggressors include various processing elements 215-220 which are controlled by the AP subsystem 202 and which relate to various system and multimedia functionality. For example, a camera serial interface (CSI) processing element 215 controls a camera (not shown) which can be disposed on or in device 100, a display serial interface (DSI) 216 controls a display (not shown) on the device 100, a secure digital (SD) controller 217 controls reading and writing to an SD card (not shown), a dual data rate (DDR) processing element 218 controls a non-persistent memory device disposed within the device 100 (not shown) and a multimedia card (MMC) processing element 220 controls a memory card (not shown) which can be removably inserted into the device 100. Each of these potential aggressors 215-220 has its own clock whose frequency can be modified or controlled by IMM and Coexistence Manager software module 214 as described below.

Consider now that the device 100 illustrated in FIG. 2 and described above establishes a call with a 2G/2G+ radio communication system, e.g., via base station 102 as described above, when an incoming call is received for the device 100 using the E-GSM900 band (i.e., having channel frequencies within the band from 925 MHz to 960 MHz).

Also consider that the device 100 is allocated the frequency hopping channel mentioned above, i.e., including (in order) frequencies 931, 936, 941, 950, 951 and 960, for the purposes of communicating with base station 102. Since call establishment is, according to an embodiment, one of the state transitions which triggers potential aggressor clock frequency modification, the cellular modem software 206 is configured (programmed) to inform the IMM and Coexistence Manager software module 214 of the frequency list which it has been allocated for this connection, i.e., a list of frequencies 931, 936, 941, 950, 951 and 960 for this particular illustrative example.

IMM and Coexistence Manager (IMM) software module 214 then uses the frequency list information to determine which victim frequency or frequencies being used by the cellular modem 200 are likely to be disturbed, or interfered with, by harmonics generated by one or more of the aggressor processing elements 215-220 and their associated clocks. For example, in the embodiment of FIG. 2, the IMM unit 214 can use its knowledge of the default frequencies generated by the clocks associated with each of the aggressor processing elements 215-220 to determine the frequencies of the various harmonics which will be generated by those circuits and then compare the harmonic frequencies to the frequencies in the frequency list. If there is a match, then the IMM unit 214 can take further action to adjust the clock frequency of the corresponding aggressor's clock frequency.

As a purely illustrative example, suppose that the default frequency of the clock for MMC processing element 220 is 104 MHz, the default frequency of the clock for DDR processing element 218 is 104 MHz, the default frequency of the clock for the SD processing element 217 is 50 MHz, the default frequency of the DSI processing element 216 is 80 MHz, and the default frequency of the clock for the CSI processing element is 80 MHz. Using those fundamental frequencies, the harmonics for each can be calculated by the IMM 214 using the well known relationships between fundamental frequencies and their corresponding harmonic frequencies, revealing that the MMC processing element 220's clock (and the DDR processing element's clock) will generate a conflicting harmonic ($8^{th}$ harmonic) at 936 MHz, the SD processing element 217's clock will generate a conflicting harmonic ($18^{th}$ harmonic) at 950 MHz, and the DSI processing element's clock (and the CSI processing element's clock) will generate a conflicting harmonic ($11^{th}$ harmonic) at 960 MHz.

Having determined that the frequency list provided by the cellular modem 200 does indeed present potential interfering situations with respect to various harmonics of the aggressors, IMM unit 214 can then take steps to change the frequencies of their respective clocks. Note that according to these embodiments since the IMM unit 214 considers all of the frequencies in the hopping sequence associated with the current channel which has been allocated to the device 100, it is in a position to intelligently change the default frequency of each respective clock to a value which will not present harmonics which conflict with any of the frequencies in the list so that additional changes to the default clock frequencies need not be made while the cellular modem 200 is hopping throughout its assigned frequency list. Instead, further changes to the aggressor's clock frequencies only need to be made when the device 100 transitions from one state to another. Thus, for example, the IMM unit 214 can send a command to the MMC processing element 220 instructing it to change its clock frequency from 104 MHz to 104.0555556 MHz (i.e., 936.5/9) such that the $8^{th}$ harmonic is now located at 936.5 MHz instead of the conflicting 936 MHz. In this embodiment, the frequency channel width is 200 kHz, although other embodiments may have other channel widths, such that the aggressor's clock frequency shift should be higher than 200 kHz to resolve conflicts, however a 500 kHz frequency shift was selected in this example.

Similarly, the IMM unit 214 can send commands to the other processing elements in the AP 202 which have harmonics which conflict with one or more of the frequencies in the frequency list to change their clocks' fundamental frequencies by a predetermined frequency increment which both (a) resolves the existing conflict with a first frequency in the frequency list and (b) does not create a new conflict with any other frequency in the frequency list. IMM 214 can check this second condition by calculating all of the harmonics associated with an initially determined modified clock frequency and comparing the calculated list of harmonics with the frequency list to ensure no matches. Otherwise, a different frequency shift can be determined by IMM 214 for an aggressor's clock and sent as an instruction to the corresponding processing element 215, 216, 217, 218 and/or 220.

Although the foregoing embodiment focused on aspects associated with the cellular modem subsystem 200, and can be applied to devices 100 having only a single radio which communicates via a single wireless access interface standard, the present invention is also more generally applicable to devices 100 which have multiple radios and/or communicate via multiple air interface standards. For example, as shown in FIG. 2, the IMM 214 can also receive information from the connectivity subsystem 204 regarding communication channel(s) which have been allocated thereto for radio communications using, e.g., the WLAN and/or BT standards. The IMM 214 can thus create a composite list of all of the frequencies which have been allocated to the device 100 for substantially concurrent communications, e.g., from the cellular subsystem 200 for GSM/GSM+, and from the connectivity subsystem 204 for WLAN and/or BT. The IMM 214 can use this composite "being used for communication" frequency list to compare with all of the harmonics of the aggressors' clocks and selectively make changes to those clocks to avoid current and future conflicts, i.e., related to future hopping frequencies. It will be appreciated that although this embodiment is provided in the context of 2G/2G+ frequency hopping radio communication systems, that other embodiments may be implemented for devices using 3G and/or 4G radio communication standards.

Figure 3:
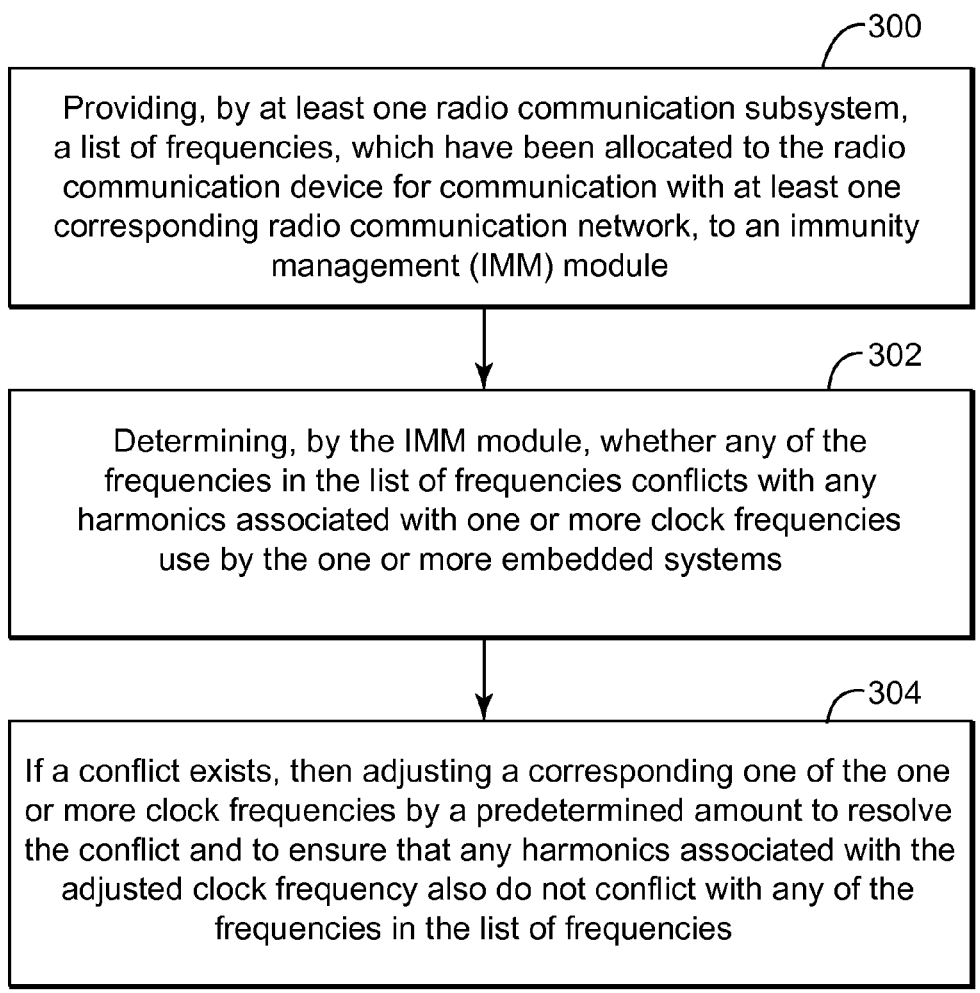
FIG. 3 is a flow chart depicting a method according to an embodiment.

Based on the foregoing discussion of the embodiments, a method embodiment for immunity management associated with one or more embedded systems operating within a radio communication device can be described by the flow chart of FIG. 3. Therein, at step 300, at least one radio communication subsystem (e.g., cellular modem subsystem 200) provides a list of frequencies, which have been allocated to the radio communication device for communication with at least one corresponding radio communication network, to an immunity management (IMM) module. The IMM module can then determine whether any of the frequencies in the list of frequencies conflicts with any harmonics associated with one or more clock frequencies used by the one or more embedded systems, as shown in step 302. If a conflict exists, then a corresponding one of the one or more clock frequencies can be adjusted, as shown in step 304, by a predetermined amount to resolve the conflict and to ensure that any harmonics associated with the adjusted clock frequency also do not conflict with any of the frequencies in the list of frequencies.

As mentioned above, one of the features of various embodiments is the capability to reduce the periodicity at which aggressors' clock frequencies are changes, to avoid problems with instability and/or latency which would potentially arise if clock frequencies were changed, e.g., on the order of the frequency hop period. Thus, as mentioned above, according to some of these immunity management embodiments, the process for determining whether to change an aggressor's clock frequency, e.g., by performing the steps illustrated in FIG. 3, can only occur when a radio communication device 100 is subject to a state transition, e.g., one or more of call establishment, call release, a channel re-allocation and/or handover as illustrated by points A-E in FIG. 1.

Figure 4:
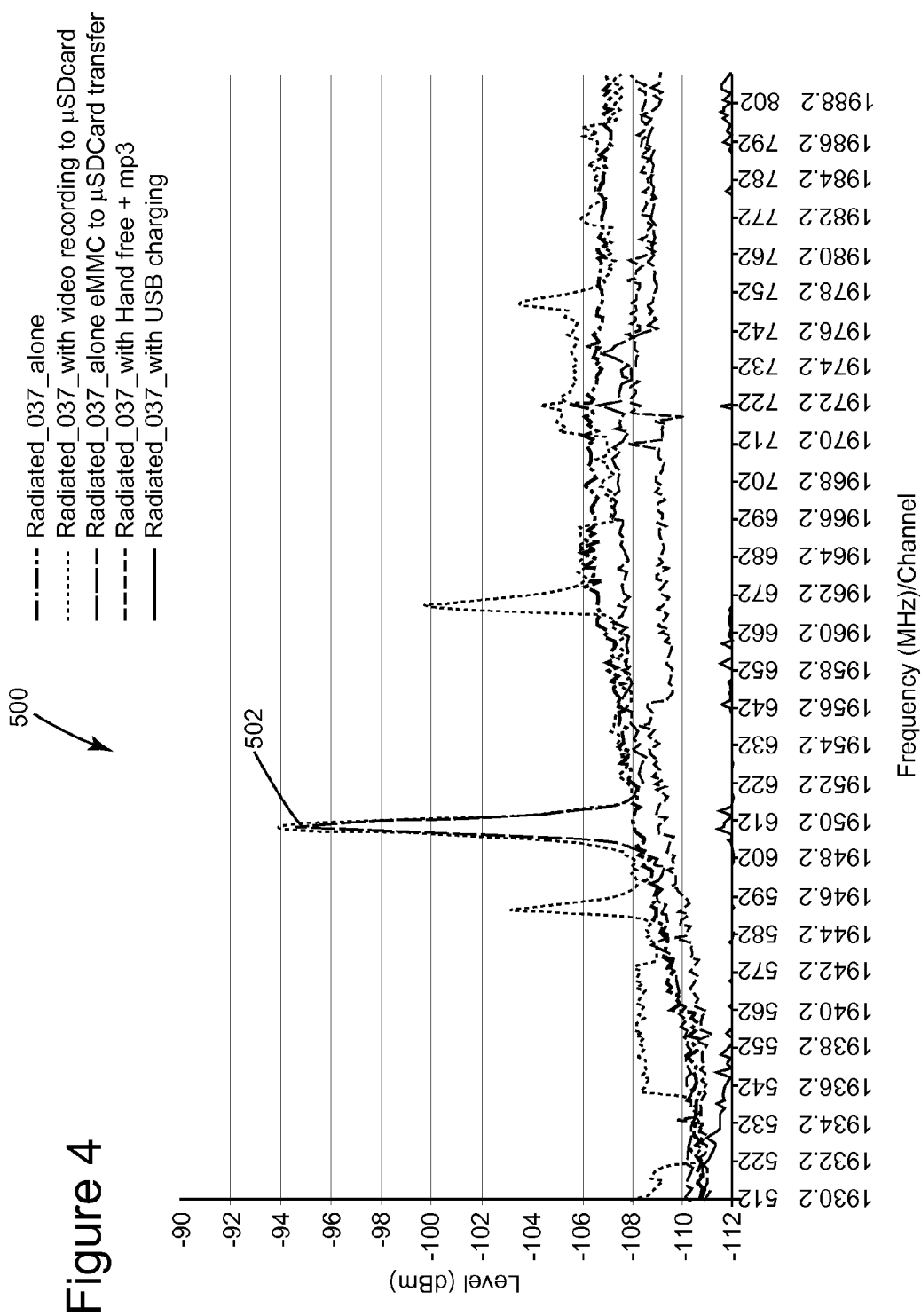
FIG. 4 is a plot illustrating various receiver sensitivities as a function of frequency.

To illustrate some of the benefits of these embodiments, simulations were performed to show the difference in receiver sensitivity under various conditions. For example, a radio device 100's receiver sensitivity was monitored for the use case where the radio device 100 was simultaneously engaged in a 2G radio call and also transferring a file from the MMC processing element 220 to a memory card. The results are shown in the plot 400 in FIG. 4. It can be seen that, for example, the cellular modem subsystem 200 is very sensitive to leaked signal energy proximate channel 612, as represented by peak 502 in plot 500. If the radio device is using channel 612 (frequency 1950.2 MHz), this interference can be removed by using the afore-described embodiments, thereby resulting in a receiver sensitivity improvement on the order of 18 dB.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

The invention claimed is:

1. A radio communication device comprising:
   at least one embedded system;
   at least one radio communication subsystem configured to transmit and receive radio communication signals and to provide a list of frequencies, which have been allocated to the radio communication device for communication with at least one corresponding radio communication network, to an immunity management (IMM) module, wherein the list of frequencies includes a hopping sequence of frequencies used by the at least one radio communication subsystem to periodically change its receive and/or transmit frequency;
   wherein the IMM module is configured to determine whether any of the frequencies in the list of frequencies conflicts with any harmonics associated with one or more clock frequencies used by the one or more embedded systems; and
   wherein if a conflict exists, then the IMM module is configured to adjust a corresponding one of the one or more clock frequencies by a predetermined amount to resolve the conflict and to ensure that any harmonics associated with the adjusted corresponding clock frequency also do not conflict with any of the frequencies in the list of frequencies; and
   wherein the radio device is further configured to adjust the corresponding one of the one or more clock frequencies only when a state transition occurs for the radio communication device, wherein the state transition consists of call establishment, call release, channel reallocation, and handover.

2. The radio device of claim 1, wherein said at least one radio communication subsystem includes a 2G/2G+ cellular modem subsystem.

3. The radio device of claim 2, wherein said at least one radio communication subsystem includes a connectivity subsystem which supports communications by the radio communication device using both wireless local area network (WLAN) and Bluetooth® (BT) radio communication standards.

4. The radio device of claim 3, wherein the frequency list includes a frequency hopping sequence associated with a channel allocated to the radio communication device by a 2G/2G+ network, at least one WLAN frequency and at least one BT frequency.

5. The radio device of claim 1, wherein the at least one embedded subsystem includes at least one of: a camera serial interface (CSI) processing element which controls a camera, a display serial interface (DSI) which controls a display, a dual data rate (DDR) processing element which controls a non-persistent memory and a multimedia card (MMC) processing element which controls a memory card.

6. The radio device of claim 1, wherein the hopping sequence of frequencies includes a set of individual frequencies within a frequency band, the conflict determination involves determining whether any of the individual frequencies within the frequency band conflict with any harmonics associated with one or more clock frequencies used by the one or more embedded systems, the adjusting resolves conflicts with all of the individual frequencies within the frequency band, and the state transition involves use of a new hopping sequence of individual frequencies within the frequency band.

7. A method for immunity management associated with one or more embedded systems operating within a radio communication device, the method comprising:
   providing, by at least one radio communication subsystem, a list of frequencies, which have been allocated to the radio communication device for communication with at least one corresponding radio communication network, to an immunity management (IMM) module, wherein the list of frequencies includes a hopping sequence of frequencies used by the at least one radio communication subsystem to periodically change its receive and/or transmit frequency;
   determining, by the IMM module, whether any of the frequencies in the list of frequencies conflicts with any harmonics associated with one or more clock frequencies used by the one or more embedded systems; and
   if a conflict exists, then adjusting a corresponding one of the one or more clock frequencies by a predetermined amount to resolve the conflict and to ensure that any harmonics associated with the adjusted corresponding clock frequency also do not conflict with any of the frequencies in the list of frequencies, wherein the steps of providing, determining, and adjusting are performed only when a state transition occurs for the radio communication device, wherein the state transition consists of call establishment, call release, channel reallocation, and handover.

8. The method of claim 7, wherein said at least one radio communication subsystem includes a 2G/2G+ cellular modem subsystem.

9. The method of claim 8, wherein said at least one radio communication subsystem includes a connectivity subsystem which supports communications by the radio communication device using both wireless local area network (WLAN) and Bluetooth® (BT) radio communication standards.

10. The method of claim 9, wherein the frequency list includes a frequency hopping sequence associated with a channel allocated to the radio communication device by a 2G/2G+ network, at least one WLAN frequency and at least one BT frequency.

11. The method of claim 7, wherein the at least one embedded subsystem includes at least one of: a camera serial interface (CSI) processing element which controls a camera, a display serial interface (DSI) which controls a display, a dual data rate (DDR) processing element which controls a non-persistent memory and a multimedia card (MMC) processing element which controls a memory card.

12. The method of claim 7, wherein the at least one embedded subsystem includes at least one of: a camera serial interface (CSI) processing element which controls a camera, a display serial interface (DSI) which controls a display, a dual data rate (DDR) processing element which controls a non-persistent memory and a multimedia card (MMC) processing element which controls a memory card.

13. The method of claim 7, wherein the hopping sequence of frequencies includes a set of individual frequencies within a frequency band, the conflict determination involves determining whether any of the of individual frequencies within the frequency band conflict with any harmonics associated with one or more clock frequencies used by the one or more embedded systems, the adjusting resolves conflicts with all of the individual frequencies within the frequency band, and the state transition involves use of a new hopping sequence of individual frequencies within the frequency band.

* * * * *